United States Patent [19]

Bönisch et al.

[11] Patent Number: 4,691,670
[45] Date of Patent: Sep. 8, 1987

[54] INSTALLATION FOR THE CONTROL OF THE CHARGING CYCLE IN INTERNAL COMBUSTION ENGINES

[75] Inventors: Heinz-Jurgen Bönisch, Groebenzell; Gerhard Brandl; Sybille Noor, both of Munich; Karl-Heinz Oehling, Karlsfeld; Walter Riedl, Munich; Mario Theissen, Munich; Ernst Wodiczka, Munich; Alwin Macht, Mainleus, all of Fed. Rep. of Germany

[73] Assignee: Bayerische Motoren Werke Aktiengesellschaft, Fed. Rep. of Germany

[21] Appl. No.: 874,871

[22] Filed: Jun. 16, 1986

Related U.S. Application Data

[63] Continuation of Ser. No. 664,777, Oct. 25, 1984, abandoned.

[30] Foreign Application Priority Data

Oct. 26, 1983 [DE] Fed. Rep. of Germany ....... 3338870

[51] Int. Cl.⁴ ............................................. F02B 75/18
[52] U.S. Cl. ................. 123/52 MF; 60/313; 123/559
[58] Field of Search ................ 123/52 M, 52 MB, 64, 123/89, 402, 509; 60/312, 313

[56] References Cited

U.S. PATENT DOCUMENTS

| 2,315,215 | 3/1943 | Maybach | 123/52 MB |
| 2,717,583 | 9/1955 | Maybach et al. | 60/313 |
| 3,845,746 | 11/1974 | Elsbett | 123/52 MB |
| 4,315,489 | 2/1982 | Tadokoro et al. | 123/213 |
| 4,470,377 | 9/1984 | Hofbauer | 123/52 MB |
| 4,484,556 | 11/1984 | Okimoto et al. | 123/559 |

FOREIGN PATENT DOCUMENTS

172818 1/1935 Switzerland .
177862 9/1935 Switzerland .

Primary Examiner—William A. Cuchlinski, Jr.

[57] ABSTRACT

An installation for controlling the charge-cycle of an internal combustion engine which includes an inlet valve and an exhaust valve as main control devices as well as a shutter arranged in the suction system as auxiliary control device. At low rotational speeds and at full load of the engine, the shutter is so controlled that it rapidly opens a cross section in the suction system during the end phase of a suction operation. An increased velocity of the fresh gas flow and a pressure wave prior to inlet-closure is achieved thereby which increases the cylinder fill. This high pressure level can be maintained in the suction system or in the manifold between the auxiliary control device and the main control device by premature closing of the auxiliary control device. A preferred embodiment includes a valve or flap symmetrically arranged on a rotating shaft which is drivingly connected with an electromagnetic rotary adjusting device that drives the valve or flap oscillatingly and/or rotatingly with very high angular accelerations and decelerations. A valve controlled according to a performance graph and driven by a motor may serve, in addition to an increase of the full load cylinder fill at low rotational speeds, also for the partial load control of the internal combustion engine.

26 Claims, 9 Drawing Figures

INSTALLATION FOR THE CONTROL OF THE CHARGING CYCLE IN INTERNAL COMBUSTION ENGINES

This is a continuation, of application Ser. No. 664,777, filed Oct. 25, 1984, now abandoned.

The present invention relates to an installation for the control of the charging cycle in internal combustion engines and starts from the arrangement as disclosed in DE-C No. 156,010.

In this prior art type of construction, a disk valve and a piston slide valve are combined for the control of the inlet and exhaust in an internal combustion engine. For the inlet, the installation for the control of the charging cycle is so constructed that during the operation of the engine the quantity ratio of air and fuel-air mixture is regulated.

The No. DE-C-665,606 as well as the DE-A No. 26 21 362 each disclose an installation for the load-, respectively, filling-regulation of an internal combustion engine, whereby a rotary slide valve common to all suction lines is connected as auxiliary control device in the suction line ahead of the inlet valves as main control devices of a multi-cylinder internal combustion engine. During the opening of an inlet valve, the associated suction line is opened at its orifice on the side of the slide valve over its entire cross section by the rotary slide valve. However, for the load-, respectively, filling-regulation, the end of the suction operation is not determined by the inlet valve but instead by the rotary slide valve. The latter closes the suction line controlled as a function of the operating point ahead of "inlet valve closes."

A similar installation is shown and described in the DE-A No. 29 38 118, in which a rotary slide valve is arranged as inlet throttling device in each suction line of a multi-cylinder internal combustion engine upstream of an inlet valve, whose control periods are variable in relation to the inlet valve.

Finally, an installation for a four-cycle diesel engine is described in the DE-C No. 476,624, in which a control slide valve is connected ahead of an inlet valve, which connects the suction line alternately with the external air and with a collecting space for pre-compressed charging air. The auxiliary or additional charging takes place at the end of the suction stroke and at the beginning of the compression stroke in the lower dead-center area of the piston. Furthermore, the control slide valve is so controlled that after the additional charging operation, the suction line between control slide valve and inlet valve is filled with air of a higher pressure. This air of slight excess pressure prevents during the opening of the inlet valve a backflow of exhaust gases into the suction line.

As is known, at low rotational speeds and high load, the fresh gas charge (charge of fuel-air mixture) remains markedly below the quantity corresponding to the stroke volume in internal combustion engines with relatively long opening periods of the inlet device, on the one hand, by reason of the backflowing exhaust gas with an opening inlet device and, on the other, by reason of the fresh gas proportion pushed back by the piston with a closing inlet device. The torque curve of the internal combustion engine is correspondingly unfavorable. Furthermore, the charging or filling of the cylinders with fresh gas is prevented by the residual gases at low through-put or flow rate of the engine both at full load as also at partial load.

The present invention is concerned with the task to so construct the arrangement described hereinabove for the control of the charging cycle that the filling or charging of the cylinders with fresh gas is improved by influencing the gas-dynamic operations.

The underlying problems are solved for the operation of an internal combustion engine at low rotational speeds and high load in that an auxiliary control device connected on the suction side ahead of the main control device opens, in particular at low rotational speed and high load of the engine, in the end phase of the opening period of the main control device, whereby the opening beginning approaches increasingly the opening beginning of the main control device with an increasing engine rotational speed. A control of the auxiliary control device relative to the associated main control device in the suction line is indicated by the present invention, pursuant to which the suction line is closed at low rotational speeds by means of the auxiliary control device over the far greatest part of the suction stroke and in which the suction line is fully opened only in the end phase of the suction operation (stroke). As a result thereof, fresh gas streams or flows of such high velocities are achieved thereby in the suction lines designed and dimensioned for the fresh gas flows for high load at high rotational speeds that the wave dynamics achieved therewith produce high cylinder fills at low rotational speeds and high load. Connected therewith is a significant increase in torque in the low rotational speeds at full load. The curve of the torque can be favorably influenced in the middle rotational speeds up to the customary torque maximum, on the one hand, by an auxiliary control device with steep cross-sectional increase during the opening of the suction line cross section; on the other hand, in that the opening beginning of the auxiliary control device which at lowest rotational speed and with an open inlet valve is placed shortly ahead of the lower dead-center position of the intaking piston, is displaced toward the opening beginning of the inlet valve with an increasing rotational speed. If the auxiliary control device is finally so controlled that it closes immediately prior to the inlet valve, a storing of the pressure level prevailing at inlet closure can be achieved therewith in the suction line. During the opening of the inlet valve at low rotational speeds and at high load—whereby the auxiliary control device closes the suction line—fresh gas at first flows into the cylinder by reason of the increased pressure level in the closed suction line. A backflow of exhaust gases which would reduce the charging or filling, is prevented therewith and additionally the residual gas discharge or removal out of the cylinder is favored thereby. The auxiliary control device is preferably arranged at such a distance from the associated main control device (inlet valve) that the conduction of the fresh gases between these devices serves as ram pipe. The torque curve can be constituted therewith favorably in the upper rotational speed range at high load (full load) with the known means, for example, with the dynamic charging effect resulting from the cam shaft and suction pipe tuning, at fully opened, and, for example, shut-down auxiliary control device.

An increased velocity of the fresh gas flow and a pressure wave prior to inlet closure of the main control device is achieved at low rotational speeds and high load by the "dynamic shutter" according to the present invention, which increases the cylinder filling. This high pressure level can be maintained by premature closing of the auxiliary control device, respectively, of the "dynamic shutter" in the suction line.

The object underlying the present invention of improving the filling or charging of the cylinders with fresh gas can be solved not only on the suction side but also on the exhaust gas side in that an auxiliary control device which is arranged on the exhaust side temporarily closes an exhaust gas line at low charge through-put or flow rate of the engine during the opening period of the main control device (exhaust valve), whereby the closing period(s) is, respectively, are controlled dependent on load and/or rotational speed for influencing pressure- and suction-waves acting toward the main control device. As is known, an exhaust phase includes a pre-exhaust shock of the highly stressed gases and the subsequent exhaust of the combustion gases effected by the piston. With a low gas flow rate of the engine--full load at low rotational speeds and partial load--the pressure and mass flow curve is particularly unfavorable between these two exhaust operations. If the auxiliary control device closes the exhaust line between these two exhaust operations of an exhaust phase, a pressure is built-up downstream of the opened exhaust valve (main control device) in the exhaust line section ahead of the closed auxiliary control device. During the rapid opening of the auxiliary control device, a suction wave effective at the exhaust valve will be produced thereby which advantageously assists the removal of the exhaust gases and therewith reduces the residual gas quantity in the cylinder.

According to a further proposal of the present invention, the residual gas quantity can finally be reduced in that the auxiliary control device which is controlled to open fully during the opening exhaust valve. (main control device), closes the exhaust gas line prior in time to the closing point of the exhaust valve. A backflow of the exhaust gas is avoided thereby which is initiated in particular during an opening inlet valve by the lower pressure level on the suction side. With the auxiliary control device arranged on the exhaust gas side and controlled according to the present invention relative to the coordinated main control device (exhaust valve), on the one hand, suction waves effective at the open main control device can be produced and, on the other hand, pressure waves flowing back which prevent the outflow of the exhaust gas at the main control device, can be held off. These measures, which lead to reduced residual gas quantities in the cylinder, effect thereby an improved filling of the cylinder with fresh gas.

A further improvement of the fresh gas filling is attainable by the combination of auxiliary control devices arranged on the suction side and on the exhaust gas side and controlled according to the present invention.

A preferred embodiment of the dynamic shutter for the arrangement on the suction side and/or on the exhaust side to improve the cylinder filling with fresh gas by influencing gas dynamic operations is attainable by further features to be described more fully hereinafter. With this construction preferred for series applications, the auxiliary control device is preferably a valve or flap arranged symmetrically on a rotatating shaft which is drivingly connected with an electromagnetic rotary adjusting device. The rotary adjusting device involving relatively new technology brings about very high angular accelerations and decelerations at the flap. It is able to move the flap arranged relatively tightly in the respective lines rapidly to and fro between predetermined angular positions for achieving a flow cross section in the line which is matched to the respective operating point (load, rotational speed) of the internal combustion engine. During the release (opening) of a maximum flow cross section, the flap pivots between the closing and the maximum opening position, to which corresponds an opening angle of about 90°. For small flow cross sections, the flap pivotally opens correspondingly less. This rotary adjusting device is furthermore able to displace the flap into the predetermined position of an opening position without overshooting so that exactly the associated free flow cross section is reached for the respective operating point. A further advantage of the rotary adjusting device is additionally that it holds the valve or flap in a predetermined open position. A flap combined with such a rotary adjusting device is able to open up the flow cross sections in the respective suction and/or exhaust lines controlled according to a performance graph. Additionally, the opening cross section increase the duration in the respective opening position and the closing cross-sectional progress of the flap as well as the coordination of the beginning and of the duration of the flap time cross section to the time cross section of the inlet and/or outlet valve can be optimally chosen with the control or regulation of the flap or valve drive by an engine performance graph as well as by further parameters external of the engines such as, for example, fuel consumption, harmful component proportion, etc. With a valve or flap having a rotary adjusting device controlled by an internal performance graph and external parameters, the opening characteristic at an operating point can be realized in the most different ways for matching to gas dynamic operations. Thus, the flap or valve may open up the entire line cross section and close the same again in a relatively short period of time. Furthermore, a partial release or opening of the line cross section is feasible which may take place relatively slowly whereby the flap or valve, after reaching the predetermined partial opening position, closes the line rapidly or slowly. Furthermore, a relatively rapid partial release of the line cross section is possible whereby the flap subsequently stays a predetermined period of time in the reached partial open position and then closes rapidly or slowly.

It follows from the aforementioned explanations that an auxiliary control device which includes a flap or valve preferably controlled by a performance graph and driven by a motor, is advantageous not only for increasing the full load-cylinder filling at low rotational speeds but may also find advantageous application for the partial load control of the internal combustion engine whereby the flap or valve thereby serves at the same time as throttle device. The flap or valve which opens up the suction line completely or partially periodically or aperiodically at a relatively large vacuum effects "apportioned" charges, so to speak of, for each combustion space which flow into the same with increased velocities. This results in higher turbulences in the inlet system and in the combustion space, which considerably improve the combustion and the mixture preparation in an advantageous manner. A lowering of the fuel consumption with better engine elasticity is achieved thereby. Furthermore, a noticeable reduction of the harmful components in the exhaust gas takes place with the improved combustion in the partial load. Finally, a favorable efficiency results for the engine. Since the inlet turbulences are of considerable significance therefor, the flap or valve may be nonuniformly accelerated, respectively, displaced during an opening-closing cycle for additionally influencing the inlet turbulences. Furthermore, the flap or valve may be aperiodically actuated during an operation at constant load, for example, for correcting predetermined exhaust emission values. The flap or valve according to the present invention fulfills additionally all functions of known turbulence systems without the disadvantage of a considerable constructive expenditure and with the advantage of the elimination of losses in the maximum output of the internal combustion engine which are conditioned thereon. In addition to the control or regulation of the turbulence in the suction system and in the combustion space according to the operating point, also an influencing according to the operating point of the inlet swirl results by means of the flap or valve, which effects advantageously the mixture preparation and combustion progress and therewith a reduction of the fuel consumption. For a desired high inlet swirl, the suction line is opened in the direction toward the combustion space to its full cross section by the flap or valve for a short period of time immediately prior to the closing of the inlet valve.

With a flap or valve which is driven by an electromagnetic rotary adjusting device with very high average angular velocity of about 2 (rad/ms), in particular a suction line or a suction system can be opened during the suction stroke for a short period of time in the entire operating range of the internal combustion engine during the dynamic operation corresponding to the respective operating point and can be kept closed for the remaining part of the operating cycle. Charge cycle work, efficiency, mixture preparation and exhaust gas emissions can be favorably influenced compared to a variable valve control with a lower mechanical expenditure by a control or regulation of the instant for opening and closing of the flap in relation to the opening and closing of the coordinated inlet valve as well as the opening degree of the flap. If the flap or valve further serves at the same time as throttle valve, it can fully assume the functions of the known electronically controlled throttle valve, whence an electronic engine output control or regulation is achieved. One or several of the flaps or valves according to the present invention may be combined with slight electronic expenditure with a selectively actuatable throttle valve arranged in the suction system.

These and other objects, features and advantages of the present invention will become more apparent from the following description when taken in connection with the accompanying drawing which shows, for purposes of illustration only, several embodiments in accordance with the present invention, and wherein:

Figures 1, 2, 3:
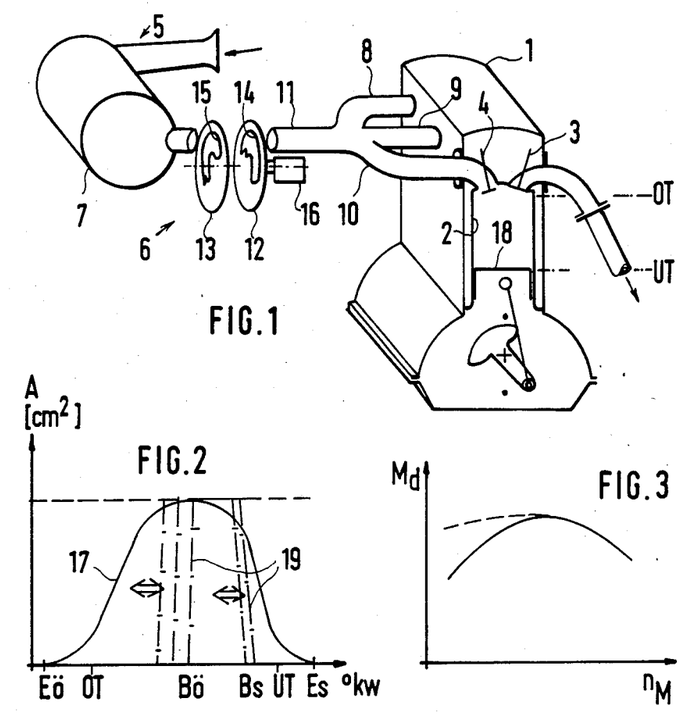
FIG. 1 is a perspective view of a control installation for the charge cycle of a multi-cylinder reciprocating piston internal combustion engine with an auxiliary control device in accordance with the present invention on the suction side.
FIG. 2 is a diagram of the time cross sections of main and auxiliary control device of the control installation according to FIG. 1.
FIG. 3 is a diagram for the torque curve of the internal combustion engine according to FIG. 1 with and without control installation according to the present invention.

Referring now to the drawing wherein like reference numerals are used throughout the various views to designate like parts, a four-cycle reciprocating piston internal combustion engine 1 illustrated in FIG. 1 includes a cylinder 2, an exhaust valve 3 and an inlet valve 4. A shutter generally designated by reference numeral 6 is arranged in a suction system 5 upstream of the inlet valve 4. Together with the inlet valve 4 and the exhaust valve 3 as main control devices, the shutter 6 forms, as auxiliary control device, an installation for controlling the charge-exchange or cycle at high load and low rotational speeds of the internal combustion engine 1.

The suction system 5 includes an air collector 7 which is connected with the suction lines 8, 9 and 10 for a group of cyliners 2 by a manifold or ram pipe 11. The shutter 6 is arranged in the manifold or ram pipe 11 near the air collector 7.

The shutter 6 includes two rotatably arranged shutter disks 12 and 13 provided with apertures 14 and 15 as well as a drive mechanism 16. The drive mechanism 16 may be driven by the internal combustion engine or may be driven separately. The shutter disks 12 and 13 of the shutter 6 illustrated for clarity in exploded view may be driven in the same and/or opposite directions. The control of the shutter disks 12 and 13 for the coordination of the shutter apertures 14 and 15 for the respective opening beginning of the manifold or ram pipe 11 relative to the opening beginning of the inlet valve 4 as well as for the opening duration of the manifold or ram pipe 11 relative to the opening duration (time cross section) of the inlet valve 4, is effected by the drive mechanism 16.

OPERATION

A curve 17 in FIG. 2 illustrates the time cross section of the inlet valve 4 during the suction operation of the internal combustion engine 1. The inlet valve 4 opens prior to the upper dead-center position OT of the piston 18 reciprocating in the cylinder 2 and closes after the lower dead-center position UT of the piston 18.

During the opening of the inlet valve 4 at lower rotational speeds and high load of the internal combustion engine, the manifold or ram pipe 11 is closed by the shutter 6 so that only the relatively slight air mass present downstream of the shutter 6 in the suction system 5 flows into the cylinder 2. With continuing downward movement of the piston 18 in the cylinder 2 from the upper dead-center position OT toward the lower dead-center position UT, a relatively strong vacuum results therefore. By controlling the shutter, respectively, the auxiliary device, the cross section of the manifold or ram pipe 11 is opened up at low engine rotational speeds and high load in such a manner that the prevailing vacuum produces a fresh gas mass stream of high velocity. This fresh gas mass flow effects, on the one hand, a high filling of the cylinder 2 and, on the other, a strong wave dynamic in the suction line which prevents the backflow of the cylinder charge. The full-load torque curve which can be achieved with the high filling at low rotational speeds is indicated in FIG. 3 by reference to the dash line.

In FIG. 2, a trapezoidal-like curve 19 illustrates the time cross section of the shutter 6 for the operation described above at an engine rotational speed $n_M = 1,000$ rpm. This curve 19 illustrates that the shutter has a steep cross-sectional opening rise and a steep cross-sectional opening decline. Throttlings of the fresh gas flow are thus avoided far-reachingly.

Additionally, the curve 19 illustrates that the shutter 6 closes immediately prior to the inlet valve 4. A relatively high pressure level is maintained therewith between both devices 4 and 6, which during the opening of one of the inlet valves 4 in the group of the cylinders 2 avoids a backflow of cylinder charge into the suction system 5 which would reduce the filling of the respective cylinder 2.

Finally, FIG. 2 illustrates that with an increasing engine rotational speed (and high load), the opening beginning of the shutter 6 is displaced increasingly earlier ahead of the lower dead-center position UT of the piston 18, respectively, is displaced toward the opening beginning of the inlet valve 4. The opening termination of the shutter 6 may be constant or may also be displaced relative to the control period of the inlet valve 4.

The velocity of the fresh gas flow is correspondingly increased for an increased filling of the cylinder 2 with the cross-sectional release in the suction line of the internal combustion engine by the shutter 6 in the end phase of a suction operation at low rotational speed and high load and finally a high pressure level, respectively, pressure wave is excited prior to inlet closure of the inlet valve 4.

Figure 4:
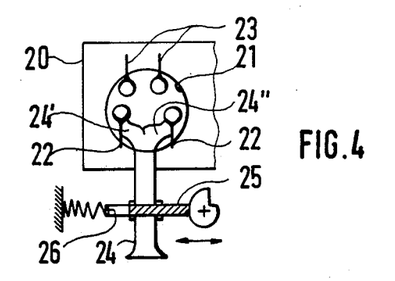
FIG. 4 is a somewhat schematic view of a further control installation in accordance with the present invention with an auxiliary control device on the suction side.

A reciprocating piston internal combustion engine 20 according to FIG. 4 includes two inlet valves 22 and two exhaust valves 23 for a cylinder 21. An oscillating shutter 25 is arranged upstream of the inlet valve 22 in a suction line (manifold or ram pipe) 24. The shutter 25 controls the line cross section of the suction line 24 by means of an aperture 26.

Figure 5:
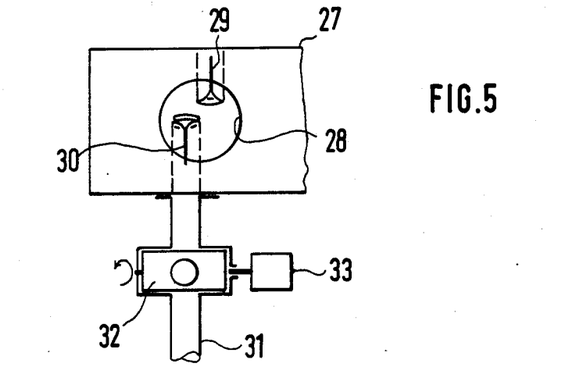
FIG. 5 is a somewhat schematic view of a modified embodiment of a control installation in accordance with the present invention with an auxiliary control device arranged on the exhaust side.

A reciprocating piston internal combustion engine 27 according to FIG. 5 includes for a cylinder 28 an inlet valve 29 and an exhaust valve 30. A shutter 32 is arranged in an exhaust gas line 31 downstream of the exhaust valve 30. The shutter 32 is operatively connected with a drive mechanism 33 which may be driven by the internal combustion engine 27 or may also be separately driven.

Figure 6:
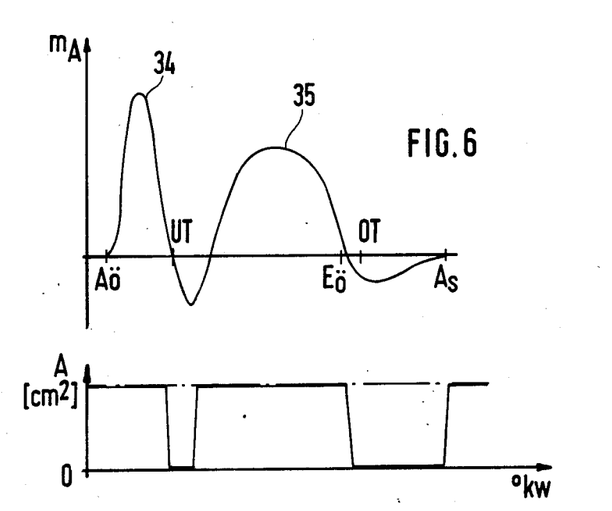
FIG. 6 is a control diagram of the auxiliary control device in the exhaust phase.

The control diagram according to FIG. 6 for the shutter 32 illustrates the curve of an exhaust gas mass flow during an exhaust phase at a small charge through-put or flow rate of the internal combustion engine 27. By a brief closing of the exhaust line 31 by means of the shutter 32 between the two mass flow peaks according to the curves 34 and 35, pressure and suction waves which act in the direction toward the exhaust valve 30 can be influenced. In order to preclude a backflow of exhaust gas into the cylinder 28 which is possible toward the end of the exhaust phase or operation, the shutter 32 closes the exhaust gas line 31, controlled as a function of the operating point, prior to "exhaust valve 30 closes" at approximately "inlet valve 29 opens."

The outflow of the exhaust gases at small through-put or rate of flow of the internal combustion engine 27 can be so controlled by the auxiliary control device (shutter 32) arranged on the exhaust gas side that the proportion in residual gas quantities can be considerably reduced in the fill.

Finally, an installation for the control of the charge-exchange or charge-cycle of an Otto or diesel internal combustion engine operated according to the four-cycle or two-cycle process may include an auxiliary control device (dynamic shutter) both on the suction side as also on the exhaust side. In addition to the illustrated arrangement of an auxiliary control device in a line section from which branch off the remaining lines arranged group-wise, an auxiliary control device may be arranged in each individual line within the scope of the present invention.

Figure 7:
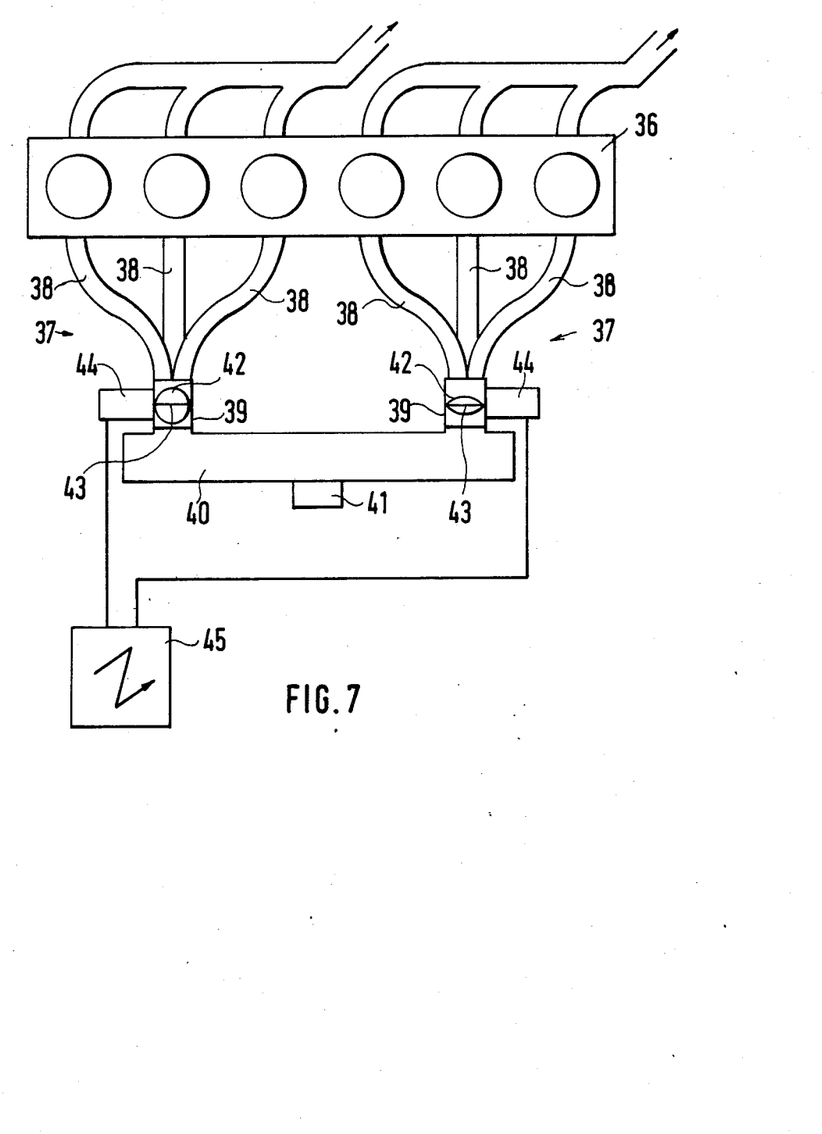
FIG. 7 is a somewhat schematic view of a further embodiment of a charge-cycle control device with pivotal flaps or valves in the suction system of a multi-cylinder internal combustion engine according to the present invention.

A multi-cylinder internal combustion engine 36 (FIG. 7) includes suction lines 38 combined into groups generally designated by reference numeral 37. The lines 38 of each group 37 terminate in a pipe stub or connection 39 which is operatively connected with an air collector 40. The air collector 40 includes an inlet 41. A flap or valve 42, which is arranged symmetrically on a rotating shaft 43, is provided in each connection 39. Each valve or flap 42 closes relatively tightly the line cross section in the respective connection 32. Each of the flaps 42 is drivingly connected by way of its rotating shaft 43 with an electromagnetic rotary adjusting device 44 of any known construction. The rotary adjusting devices 44, in contrast to the customary adjusting motors, are able to drive the valves or flaps 42 with an average minimum angular velocity $w \simeq 2$ (rad/ms). They are further able by reason of their strong and constant magnetic field to keep each flap or valve 42 in a predetermined angular position against the forces of the inflowing fresh charge. The rotary adjusting devices 44 which are constructed according to recently developed technology, are operatively connected with an electronic control or regulating device 45. Of internal characteristic magnitudes of the internal combustion engine, parameters such as load, rotational speed, ignition, intended rotational speed and temperature and additionally of external characteristic magnitudes, consumption and exhaust gas emission values are fed into the device 45. Furthermore, performance graphs of the internal combustion engines are stored in the control or regulating device 45. By means of the electronic device 45 of any known suitable construction, each valve or flap 42 is opened for a correspondingly short or long period of time during a suction stroke to achieve the desired fill at the respective operating point. The throttle valve 42 of the left group is illustrated in an open position whereas the valve 42 of the right group 37 is illustrated in the usual closing position.

Each valve or flap 42 thus pivots from the closing position into a predetermined opening position and subsequently again back into the closing position. With a constant load and rotational speed and with the other parameters remaining constant, a periodic opening and closing, respectively, pivoting between the predetermined angular position thus results for a valve or flap 42 in relation to a coordinated combustion space. This means, according to the diagram according to FIG. 8, that the instants for opening and closing the valve 42 remain constant relative to the instants for the opening and closing of the inlet valve. The time cross section of the flap or valve 42 serving as dynamic shutter is thereby indicated by the curve 46 whereas the curve 47 illustrates the time cross section of an inlet valve. If at a constant load and roational speed of the internal combustion engine, a deviation occurs with one of the external engine parameters, for example, the exhaust gas emission values, then this deviation can be eliminated by an aperiodic actuation of the valve 42, whereby the instants for opening and closing the valve or flap 42 with respect to those of the inlet valve can be changed continuously in a desired manner, curves 46' and 46".

Figure 8:
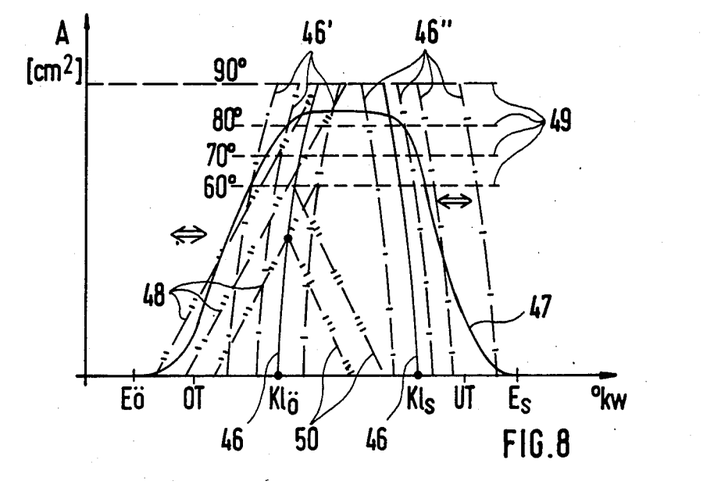
FIG. 8 is a diagram of the time cross section of inlet valve and pivotal valve according to FIG. 7.

For matching the fill to the respective operating point, it is further possible by means of the electronic device 45 to change the steep opening rising flank 46' into a more flat rising flank 48. Furthermore, the flow cross section in the connection 32 which is opened up by the pivoting valve or flap 42 can be realized by a lesser deflection out of the closing position, as is illustrated by the curves 49. The duration of the flap or valve 42 in the open position can be varied therewith. With the aforementioned time cross sections according to curves 46 and 49 of the flap or valve 42, the latter remains over a predetermined period of time in the attained angular position, respectively, open position before it closes again. High fills are achieved with this time behavior, especially at low rotational speeds and high load of the internal combustion engine 36.

As can be further seen from FIG. 8, the flap or valve 42, after reaching a predetermined open position, can be controlled immediately again into the closing position by the electronic device 45 as is indicated, for example, by the curves 50. Any desired time cross sections of the flap or valve 42 can be realized therewith. In conjunction with an opening instant of the flap or valve 42 which is variable with respect to the time cross section of the inlet valve, it thus follows that also the fill of the internal combustion engine can be controlled or regulated in the partial load operation by means of the flap or valve 42. The dynamic behavior of the flap or valve 42 driven by a rotary adjusting device 44 of new technology thus permits to control or regulate the internal combustion engine 36 during the dynamic operation in the entire operating range.

The flap or valve 42 can be driven not only pivotally or oscillatingly, but also rotatingly. For reasons of the gas dynamic processes, a combination of both types of drive is also feasible at the flap or valve 42.

Figure 9:
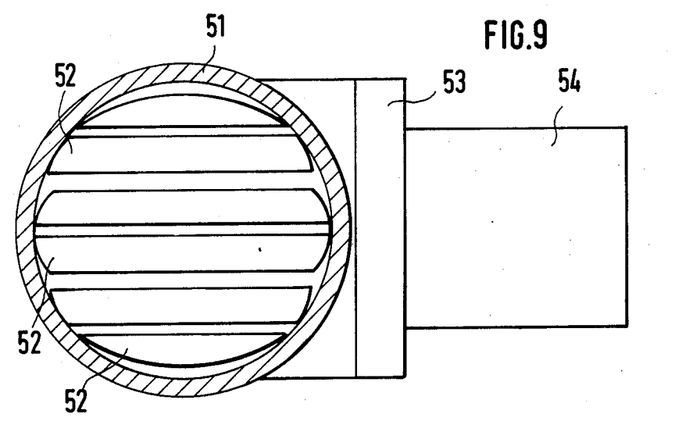
FIG. 9 is an elevational view, partially in cross section, of a further embodiment in accordance with the present invention with several pivotal flaps arranged in one plane of a line cross section.

In lieu of a single flap or valve 42, several motor-driven flaps or valves 52 may be arranged in a cross section of a line 51 according to FIG. 9. The flaps 52 indicated in an open position are arranged parallel to one another in a transverse plane of the line 52 and overlap one another in the closing position (not shown). The flaps 52 are drivingly connected by way of an intermediate gear 53 with a rotary adjusting device 54 of the type described above.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims

We claim:

1. An installation for controlling the charge-exchange in internal combustion engines, comprising main control means for controlling the timing of a total inlet charge to the internal combustion engine and auxiliary control means coordinated to the main control means, whereby the auxiliary control periods are variable, said auxiliary control means being operatively connected on the engine suction side upstream of the main control means to also control the timing of the total inlet charge by overriding the timing called for by the main control means and opening in the end phase of the opening period of the main control means, and the opening beginning of the auxiliary control means, with increasing engine rotational speeds increasingly approaching the opening beginning of the main control means.

2. An installation according to claim 1, wherein said main control means include at least one of inlet and exhaust valves.

3. An installation according to claim 1, wherein said auxiliary control means includes a shutter means.

4. An installation according to claim 1, wherein said auxiliary control means opens at low rotational speed and high load of the engine shortly prior to a piston reaching lower dead-center in a cylinder of the internal combustion engine to which the charge is directed.

5. An installation according to claim 1, especially for reciprocating piston internal combustion engines having inlet and exhaust valve means as main control means, the respective auxiliary control means having a steep rise in the opening cross section and an open cross section substantially corresponding to the cross section of the respective line, the auxiliary control means on the engine suction side opening at low rotational speed and simultaneous high load shortly prior to the lower dead-center of the intaking piston and closing prior to the inlet valve means, whereby with increasing rotational speed, the opening beginning of the auxiliary control means is controlled increasingly earlier prior to the lower dead-center of the intaking piston to approach the opening beginning of the inlet valve means.

6. An installation according to claim 1, wherein the auxiliary control means is arranged in a part of a suction system serving as ram pipe within the end area remote from the engine of the ram pipe.

7. An installation according to claim 6, wherein the auxiliary control means is arranged in a line part from which branch off the remaining suction lines arranged group-wise.

8. An installation for a multi-cylinder internal combustion engine according to claim 1, wherein a single auxiliary control means controls several suction lines corresponding to the ignition sequence of the engine.

9. An installation according to claim 1, wherein an auxiliary control means which is arranged at the suction side, is effective in a low rotational speed range under high load of the engine and wherein an auxiliary control means is also arranged on the exhaust gas side which is effective during low charge through-put of the engine.

10. installation according to claim 9, wherein the auxiliary control means on the suction side closes at about the closing point of the main control means.

11. An installation according to claim 1, wherein the auxiliary control means is a motor-driven valve means, a driving motor controlled in dependence on characteristic magnitudes of the engine, and the valve means being actuated between predetermined angular positions in the respective line.

12. An installation according to claim 11, wherein the valve means is actuated periodically between predetermined angular positions.

13. An installation according to claim 11, wherein the valve means is actuated aperiodically between predetermined angular positions.

14. An installation according to claim 11, wherein the characteristic magnitudes include at least one of load, rotational speed, temperature and fuel consumption.

15. An installation according to claim 11, wherein said valve means oscillates.

16. An installation according to claim 11, wherein said valve means is actuated discontinuously.

17. An installation according to claim 11, wherein said valve means rotates.

18. An installation according to claim 11, wherein said valve means is actuated continuously.

19. An installation according to claim 11, wherein the auxiliary control means include several motor-driven valve means which are arranged substantially parallel to one another in a cross plane of the respective line.

20. An installation according to claim 11, wherein the driving motor drives the valve means with an average minimum velocity of $w \cong 2$ (rad/ms) and furthermore is operable to hold the valve means in a predetermined position.

21. An installation according to claim 20, wherein the driving motor is an electromagnetic rotary adjusting means.

22. An installation for the control of the charge-exchange in internal combustion engines comprising main control means and auxiliary control means coordinated to the main control means at both an inlet and exhaust side of the internal combustion engine for controlling the timing of an inlet charge and an exhaust of the internal combustion engine, whereby the auxiliary control periods are variable, the auxiliary control means on the engine exhaust side temporarily closing an exhaust gas line during the opening period of the main control means at the engine exhaust side at a low charge through-put of the engine, and the closing period thereof being controlled as a function of at least one of load and rotational speed for influencing pressure and suction waves acting on the main control means.

23. An installation according to claim 22, for a reciprocating piston internal combustion engine with inlet and exhaust valve means as main control means, wherein the auxiliary control means temporarily closes the exhaust gas line with an open exhaust valve means and in a piston position within the lower dead-center area at the beginning of the exhaust gas discharge by the piston.

24. An installation according to claim 23, wherein the auxiliary control means closes the exhaust line ahead of the exhaust valve means at approximately "inlet valve means opens."

25. An installation according to claim 24, wherein said auxiliary control means is a shutter means.

26. An installation according to claim 22, wherein several exhaust gas lines are combined group-wise with a manifold, an auxiliary control means being arranged in each exhaust gas line, said auxiliary control means being so controlled that during the exhaust operation into one of the exhaust gas lines, the remaining exhaust gas lines are closed by the auxiliary control means.

* * * * *